March 1, 1949.　　　　　R. A. KAISER　　　　　2,463,181
AIRCRAFT CONTROL
Filed Nov. 9, 1944　　　　　　　　　　　　　　3 Sheets-Sheet 1
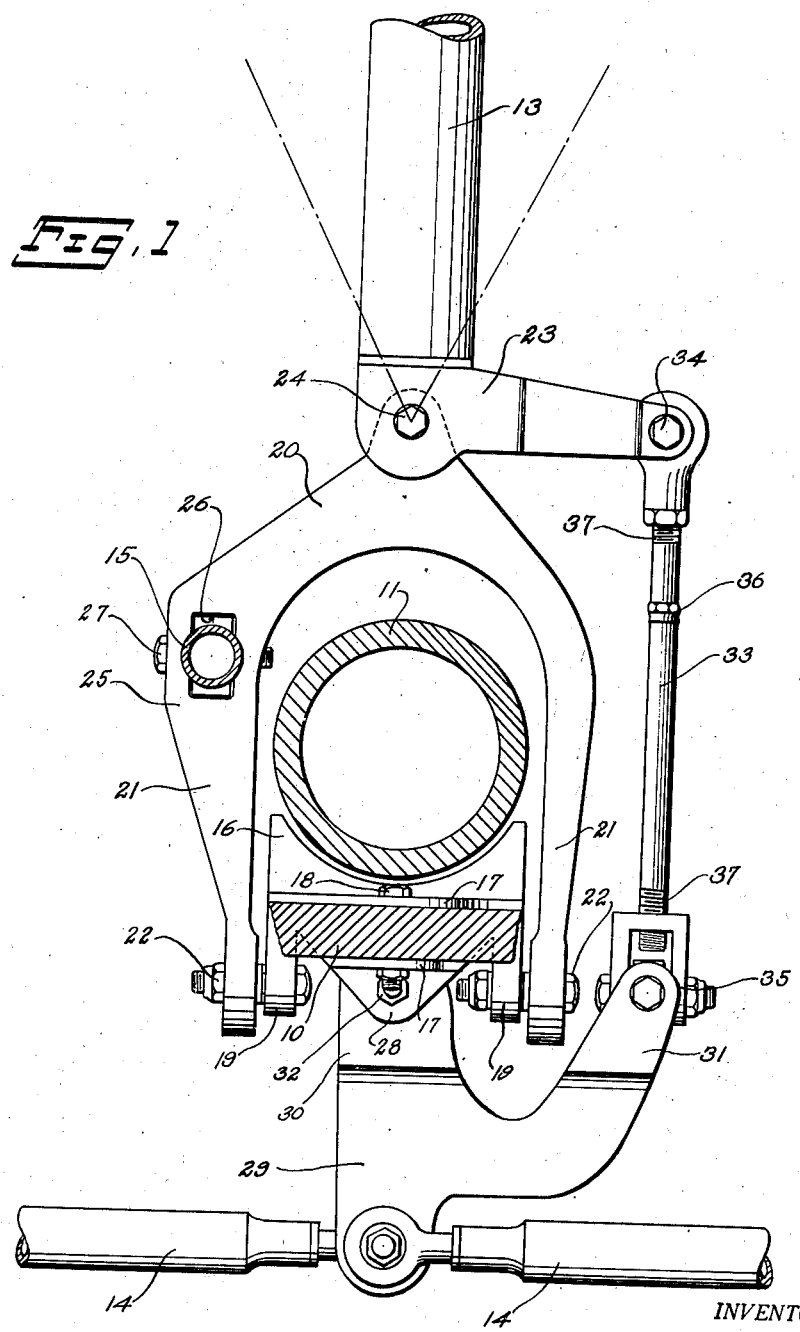
INVENTOR.
Robert A. Kaiser
BY
ATTORNEY.

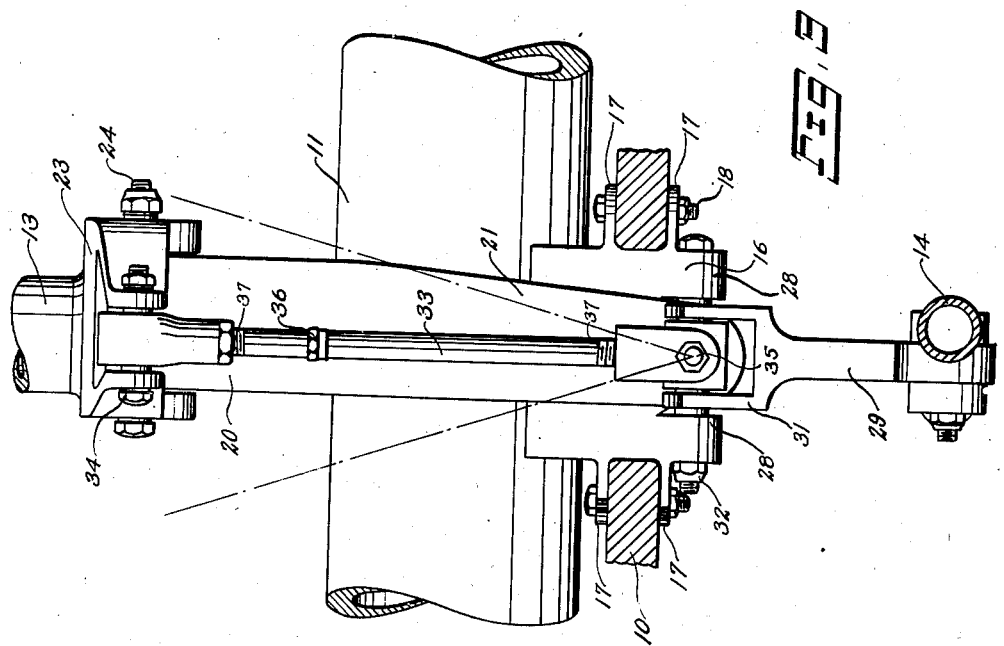
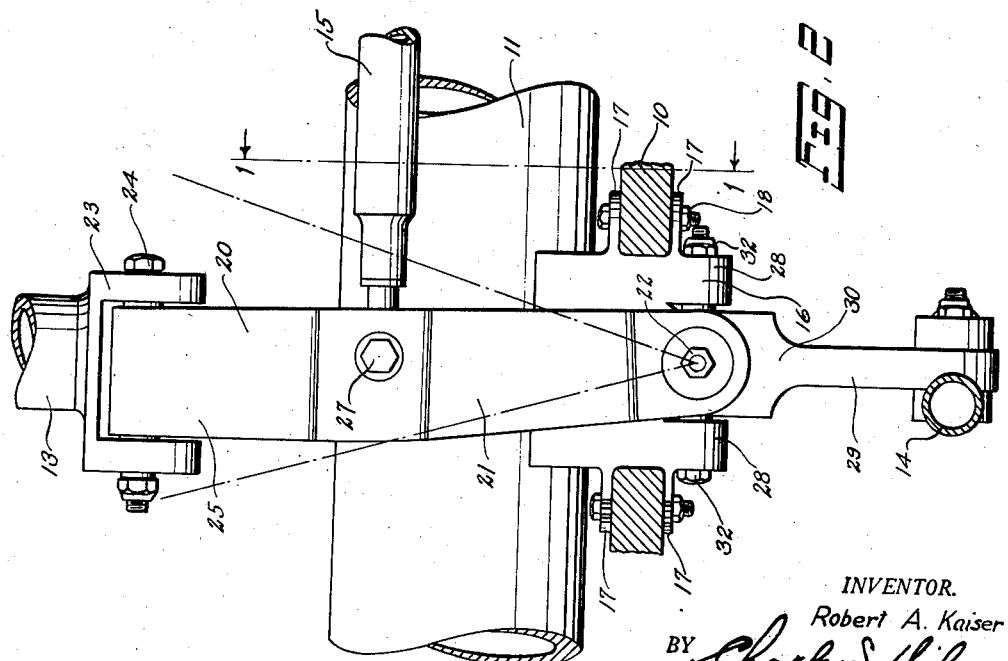

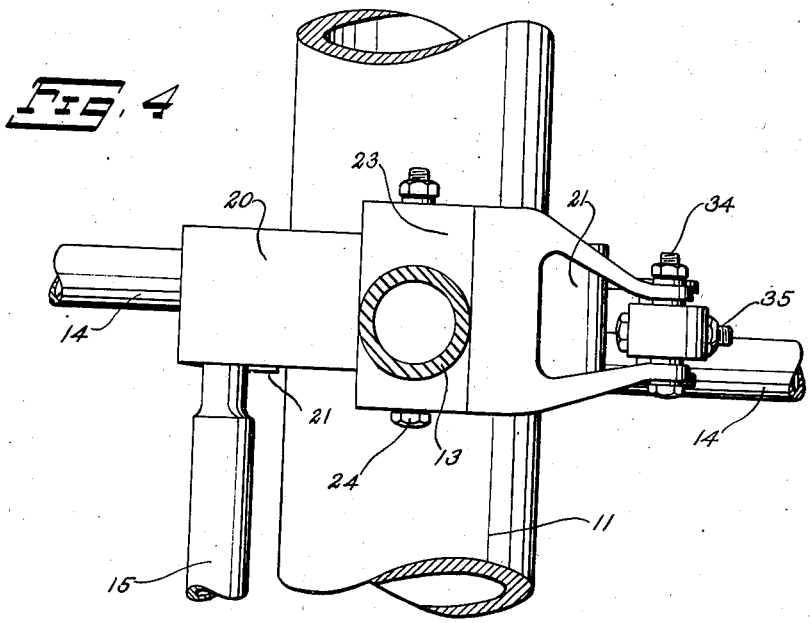
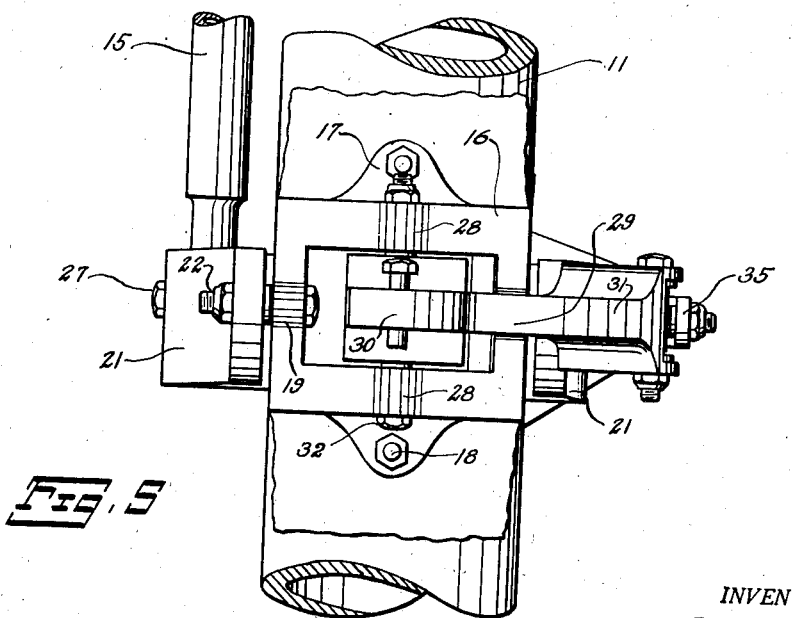

Patented Mar. 1, 1949

2,463,181

UNITED STATES PATENT OFFICE 2,463,181

AIRCRAFT CONTROL

Robert A. Kaiser, Flushing Heights, Long Island, N. Y., assignor to Republic Aviation Corporation, Farmingdale, N. Y., a corporation of Delaware Application November 9, 1944, Serial No. 562,699

8 Claims. (Cl. 244—83)

This invention relates to aircraft controls and proposes a control lever that is operative under conditions and at places where the conventional control lever assembly would be ineffective or inoperative because of its location with reference to, or because of interference with its normal or conventional operation, by structural or other parts of the aircraft.

With this and other objects in view, as will be apparent, this invention consists in the construction, combination and arrangement of parts all as hereinafter more fully described, claimed and illustrated in the accompanying drawings, wherein:

Fig. 1 is an elevation of the present control lever and coacting controls illustrated in conjunction with an obstruction disposed longitudinally of the cockpit floor, being generally a vertical section along the line 1—1 of Fig. 2;

Fig. 2 is an elevation from one side of the present control;

Fig. 3 is an elevation of the control viewed from its opposite side;

Fig. 4 is a top plan view of the present control with the control lever shown in section; and Fig. 5 is a bottom view of the control assembly with the connecting aileron push-pull rods eliminated for clearness of illustration.

The conventional control of an aircraft comprises a lever which may be moved in a fore-and-aft direction to operate the elevators and laterally or span-wise to control the ailerons. Thus the conventional control of an aircraft comprises a lever having independent movements in two directions and operative connections between this lever and the controlled surfaces, all of which operate freely and without interference from or by structural parts or components within or forming a part of the cockpit, cabin or other aircraft structure.

In some aircraft, obstructions which would interfere with the normal operations of the conventional type of control lever are built into or incorporated in the aircraft structure or in the cabin or cockpit thereof, such as, for example, a power shaft passing fore-and-aft through the cockpit or cabin. The present invention contemplates a control lever which will operate and function exactly as does the conventional control lever, and at the same time accommodate or operate around any structural part of the aircraft which would ordinarily interfere with the operation of the conventional control. In short, the present invention is such that its structure avoids or accommodates the obstruction and yet maintains the characteristic operation of the conventional control lever. It is to be understood, however, that it is not essential to this invention that a power shaft be the sole type of obstruction positioned to interfere with the normal operation of a control lever, and that any interference or structural obstruction embodied in the aircraft and situated to interfere with the normal operation of the control lever will demonstrate the utility of this invention.

In the accompanying drawings 10 designates a fixed structural part of an aircraft, such as the floor of the cabin or cockpit, over which extends the obstruction which the present invention proposes to accommodate. This obstruction is here shown as a tubular power shaft 11 extending fore and aft on the approximate longitudinal axis of the aircraft, but it will be manifest that the obstruction may reside in or consist of any structural part or feature of the aircraft so positioned as to impede or interfere with the operation of the conventional control lever. A control lever 13 is positioned above the floor 10 and in the particular arrangement of parts illustrated as one example of the use of this invention, is situated generally above and in the vertical plane of the fore-and-aft obstruction or power shaft 11.

In the type of assembly here shown for the control of the adjustable airfoils the push-pull rods 14, for the conventional control of the ailerons, extend spanwise of the aircraft below the floor 10 to be connected by any standard linkage system to the controlled airfoils. Above the floor 10 is situated the push-pull rod 15, extending longitudinally of the aircraft to be connected to the elevator by any standard linkage system. The rods 14—15 and their positions relative to the floor 10 or other structural part of the aircraft form no part of the present invention and are illustrated as shown merely to serve as one example of controls or airfoil operating connections that can coact with the instant control lever assembly. The rod 15 is here shown as substantially parallel to and at one side of the power shaft 11, but it is manifest that it can be located in any other convenient and practical position.

In substantial vertical alignment with the control lever 13, when in its neutral position, the floor 10 is apertured to receive a bracket 16 which is secured within the aperture in any suitable manner. To that end outstanding parallel spaced ears 17, project from the sides of the bracket 16 to receive and embrace the floor 10 therebetween. Bolts 18 passing through the ears 17 and the floor 10 rigidly and fixedly secure the bracket 16 in place whereby it extends somewhat upon both sides of the floor. It is this bracket 16 which supports the control lever 13 and the components of the control assembly associated therewith.

Lying in a plane transverse to the axis of the power shaft 11 and projecting below the floor 10, the bracket 16 has a pair of spaced, parallel supporting lugs 19. A U-shaped yoke 20 is disposed above the floor 10 to span and embrace the power shaft 11 or other obstruction or structural part of the aircraft. The arms 21 of the yoke 20 pass through appropriate apertures or openings in the floor 10 upon each side of the bracket 16 to terminate adjacent to and parallel with the supporting lugs 19. Pivot pins 22, shown in the form of bolts, pierce the extremities of the arms 21 and the supporting lugs 19 to thereby pivotally support the yoke 21 upon the lugs 19 for oscillation or swinging movement in a fore-and-aft direction, as indicated by the radius lines in Figs. 2 and 3.

Centrally pivoted, as at 24, to the base of the yoke 20 directly above the bracket 16 is an operating arm 23 to which is rigidly secured the lower end of the control lever 13. The control lever 13 is disposed substantially at right-angles to the operating arm 23 and is rigidly connected to the inner extremity thereof, whereby the control lever 13 combines with the arm 23 to form what, in effect, is a bellcrank lever, which is neutral, has its arm 23 normally extending from the lower end of the lever 13 in a plane parallel to the floor 10 while, at the same time, the control lever 13 is normal to the floor and in approximate central alignment with the bracket 16. As the control lever 13 swings spanwise about its pivot 24, as indicated by the radius lines of Fig. 1, the arm 23 correspondingly swings in a vertical plane about the same pivot.

The push-pull rod 15 for the control or operation of the elevator or elevators is pivotally attached to one of the arms 21 of the yoke 20 which is enlarged at 25 and there apertured, as at 26, for that purpose. The extremity of the push-pull rod 15 is inserted in the aperture 26 and is pivotally fastened therein by a bolt or other suitable pivot pin 27. Thus as the control lever 13 is moved fore-and-aft for the regulation of the elevators, the yoke 20 will move correspondingly about the pivot pins 22 imparting a reciprocating movement to the rod 15. This fore-and-aft movement in unison of the yoke 20 and the control lever 13 moves the operating arm 23 in unison with yoke and lever in a fore-and-aft arc about the axis of the pivot pins 22.

For the operation of the push-pull rods 14 to control or operate the ailerons, a second pair of spaced, parallel supporting lugs 28 are provided on the bracket 16 to extend below the floor 10, and have the upper extremity of the vertical arm 30 of a bellcrank lever 29 pivoted therebetween by the pins or bolts 32. The other arm 31 of this bellcrank lever 29 extends upwardly and diverges from the arm 30 to terminate at or beyond one side of the yoke 20 and in the approximate axis of the pivot pins or bolts 22 by which the arms 21 of the yoke 20 are secured to the supporting lugs 19.

Interposed between the end of the operating arm 23, rigid with the control lever 13, and the upper extremity to the diverging arm 31 of the bellcrank lever 29 is a link 33. At its upper end the link 33 is pivotally connected, as at 34, to the outer extremity of the operating arm 23 and at its lower end is connected by a Hooke or other adaptable universal joint 35 to the upper extremity of the arm 31 of the bellcrank lever 29. It is to be observed that the pivotal axis on which the link 33 swings in a fore-and-aft direction under the impetus of the control lever 13, is coextensive with the pivotal axis about which the extremities of the arms 21 of the yoke 20 swing in a like direction.

The push-pull rods 14 for the control and operation of the ailerons are pivotally secured to the lower extremity of the bellcrank lever 29 directly below and in approximate vertical alignment, in neutral position of the control, with the axis of the pivot pins 32 about which this bellcrank lever swings with respect to the bracket 16 and to the supporting lugs 28. This pivotal connection of the rods 14 is also in substantial vertical alignment with the pivot 24 by which the control lever 13 and operating arm 23 are pivoted to the yoke.

In short, the bellcrank lever 29 may be said to be a link or arm 29 pivoted at its opposed ends respectively to the adjoining extremities of the push-pull rods 14 and between the supporting lugs 28 of the bracket 16. Between these pivotally connected terminals it is provided with an upwardly divergent, lateral arm or extension terminating beyond the side of the yoke 20 in vertical alignment with the outer extremity of the operating arm 23 and in the approximate horizontal plane of the axis represented by the pivot pins 22 about which the yoke 20 as a unit swings in a fore-and-aft direction.

The conventional spanwise movement of the control level 13, as indicated by the radius lines in Fig. 1, causes the arm 23 to move in unison with the lever about the pivot 24 thereby swinging its outer end either upwardly or downwardly. By means of the link 33 this movement of the arm 23 is imparted to the bellcrank lever 29 through the arm 31 thereof, causing it to swing about the pivots 32 to reciprocate the push-pull rods 14 for aileron control. Upon the conventional fore-and-aft movement of the control lever 13, as indicated by the radius lines in Figs. 2 and 3, the yoke 20 moves in unison with and as a part thereof about the pivots 22 to impart a corresponding reciprocating movement to the push-pull rod 15 for elevator control. Since the axis of the pivotal connection between the link 33 and the arm 31 is coextensive with the axis of the pins 22 by which the loke 20 is pivotally mounted on the bracket 16, the link 33 will move fore-and-aft in unison with the yoke 20 but without imparting any movement to the bellcrank lever 29 or to the push-pull rod 14 in the absence of spanwise movement of the control lever 13.

The link 33 is provided with a faced collar 36 fixed thereto medially of its length by which it may be rotated to adjust its threaded extremities 37 with respect to the connected components of the assembly, thus providing means whereby the axis of the pivotal connection between the link 33 and the arm 31 may be aligned spanwise with the axis of the pivot pins 22 and the entire assembly otherwise adjusted.

From the foregoing it is manifest that the control lever 13 has all of the customary movements required of a standard, conventional control lever and at the same time avoids any structural irregularities or obstructions which otherwise would interfere with such normal, conventional operation.

While a tubular power shaft 11 is shown as constituting the obstruction around which the present invention operates and to which it accommodates the normal movements of the control lever 13, it is to be understood that the present invention is fully effective in conjunction with any type of obstruction and can be modified for that purpose without departing from the spirit and scope hereof.

What is claimed is:

1. In an airfoil control the combination with a U-shaped yoke pivoted at the extremities of its arms for fore-and-aft movement, of a control lever pivoted to said yoke for fore-and-aft movement in unison therewith and for independent spanwise movement, a lateral operating arm fixed to said lever for movement with it in either of said directions, a pivotally mounted vertical arm the axis of pivotal movement of the arm bisecting the axis of pivotal movement of said yoke, a transverse extension on said vertical arm terminating in alignment with the extremity of the lateral operating arm carried by the control lever, a link interposed between the ends of said operating arm and said transverse extension, a pivoted connection between one end of the link and said operating arm, a universal connection between the other end of the link and said transverse extension, having an axis coextensive with the pivotal axis of the yoke when said control lever is in its neutral spanwise position, a connection between the yoke and a controlled airfoil, and a connection between the vertical arm and a second controlled airfoil.

2. The combination with a fixed aircraft structure, of a U-shaped yoke having the extremities of its arms pivoted to said structure for fore-and-aft oscillation, a control lever pivoted at one end centrally to the base of said yoke for spanwise swinging movement relative to said yoke and fore-and-aft oscillation in unison with the yoke, a laterally extending operating arm rigid with the control lever at its pivotal connection to the yoke, a vertical arm pivoted at one end between the pivoted terminals of the arms of the yoke on an axis bisecting the pivotal axis of said yoke, a divergent transverse extension of said vertical arm terminating in vertical alignment with the outer end of said operating arm, a link pivoted at one end to the outer extremity of the operating arm, and a universal joint between the other end of said link and the outer extremity of said transverse extension having an axis lying on and coextensive with the pivotal axis of the yoke aforesaid.

3. The combination with a fixed aircraft structure, of a U-shaped yoke having the extremities of its arms pivoted to said structure for fore-and-aft oscillation, a control lever pivoted centrally to the base of said yoke for spanwise swinging movement relative to said yoke and fore-and-aft oscillation in unison with the yoke, a laterally extending operating arm rigid with the contol lever at its pivotal connection to the yoke, a vertical arm pivoted at one end between the pivoted terminals of the arms of the yoke on an axis bisecting the pivotal axis of said yoke, a divergent transverse extension of said vertical arm terminating in vertical alignment with the outer end of said operating arm, a link pivoted at one end to the outer extremity of the operating arm, a universal joint between the other end of said link and the outer extremity of said transverse extension, having an axis normally lying on and coextensive with the pivotal axis of the yoke aforesaid, and means for adjusting the effective length of said link.

4. The combination with a fixed aircraft structure, of a U-shaped yoke having the extremities of its arms pivoted to said structure for fore-and-aft oscillation, a control lever pivoted centrally to the base of said yoke for spanwise swinging movement relative to said yoke and fore-and-aft oscillation in unison with the yoke, a laterally extending operating arm rigid with the control lever at its pivotal connection to the yoke, a vertical arm pivoted at one end between the pivoted terminals of the arms of the yoke on an axis bisecting the pivotal axis of said yoke, a divergent transverse extension projecting from said vertical arm adjoining its other end and terminating in vertical alignment with the outer end of said operating arm, a link pivoted at one end to the outer extremity of the operating arm, a universal joint between the other end of said link and the outer extremity of said transverse extension having an axis normally lying on and coextensive with the pivotal axis of the yoke aforesaid, means for adjusting the effective length of said link, an airfoil operating connection secured to said yoke, and a second airfoil operating connection secured to the outer free extremity of said vertical arm.

5. The combination with a fixed aircraft structure, of an inverted U-shaped yoke having the extremities of its arms pivoted to said structure for fore-and-aft oscillation, a control lever pivoted centrally to the base of said yoke for spanwise swinging movement relative to said yoke and fore-and-aft oscillation in unison with the yoke, a lateral operating arm fixed to the control lever, a vertical arm pivoted at one of its ends on an axis parallel to the axis of pivotal movement of the control lever relative to the yoke and bisecting the pivotal axis of the yoke, an angularly disposed extension of said vertical arm divergent from said arm adjoining its free end and terminating in substantial alignment with the outer end of the lateral operating arm and on the pivotal axis of the yoke, a link pivoted at one end to the outer extremity of the lateral operating arm aforesaid, a universal joint between the other end of said link and the outer extremity of said divergent extension having an axis approximately coextensive with the pivotal axis of the yoke, connections for airfoil adjustment pivoted to said vertical arm at the free end thereof below said divergent extension, a second connection for airfoil adjustment pivoted to said yoke, and means for adjusting the effective length of said link.

6. In an airfoil control the combination with a support mounted to oscillate about a pivotal axis, of a control lever mounted on said support to swing about a pivotal axis at right angles to the axis of the support, a lateral operating arm fixed to said lever to project beyond the limits of said support, an arm normally coextensive with the control lever in neutral and pivoted on an axis parallel to and spaced from the pivotal axis of the control lever for its movement relative to the support, and an operative connection between said last arm and the lateral operating arm whereby said arms swing simultaneously about their respective pivotal axes under the impetus of the control lever.

7. The combination with the control lever of an aircraft having a pre-determined neutral position, of a support for said lever whereby it may oscillate fore-and-aft or spanwise to and from said neutral position, a connection whereby the fore-and-aft movements of said lever may operate a first adjustable airfoil, a second lever pivoted for spanwise movement and to align with said control lever when in neutral, a connection for operating a second adjustable airfoil from said second lever, and an operative connection between the control lever and the second lever spaced from and parallel to the plane of said levers upon alignment thereof in neutral, whereby the spanwise movement of a control lever out of neutral imparts movement to the second lever to operate the second airfoil connection.

8. The combination with the control lever of an aircraft, of means for supporting said lever for oscillation in either of two directions to and from a predetermined neutral position, a second lever spaced from and disposed in alignment with the control lever when in neutral, a link spaced from said levers and substantially parallel thereto when in neutral, and a connection between said link and each of said levers whereby the movement of the control lever imparts a movement to the second lever through said link.

ROBERT A. KAISER.

REFERENCES CITED

The following references are of record in the file of this patent:

UNITED STATES PATENTS

| Number | Name | Date |
| --- | --- | --- |
| 1,264,498 | Foley | Apr. 30, 1918 |
| 1,803,498 | Chilton | May 5, 1931 |
| 1,855,988 | Ranasey | Apr. 26, 1932 |
| 2,066,375 | Truman | Jan. 5, 1937 |
| 2,080,522 | Wilford et al. | May 18, 1937 |
| 2,082,410 | McCauley | June 1, 1937 |
| 2,252,080 | Lapsley | Aug. 12, 1941 |
| 2,290,224 | Bowers et al. | July 21, 1942 |

FOREIGN PATENTS

| Number | Country | Date |
| --- | --- | --- |
| 618,539 | France | Dec. 16, 1926 |